United States Patent [19]

Barri et al.

[11] Patent Number: 5,210,742
[45] Date of Patent: May 11, 1993

[54] COMMUNICATION PROCESS AND SWITCHING ELEMENT FOR CARRYING OUT THIS PROCESS

[75] Inventors: Peter I. A. Barri, Bonheiden; Luc O. Beyne, Lochristi, both of Belgium

[73] Assignee: Alcatel N.V., Amsterdam, Netherlands

[21] Appl. No.: 613,511

[22] PCT Filed: May 28, 1988

[86] PCT No.: PCT/EP88/00482
§ 371 Date: Oct. 31, 1990
§ 102(e) Date: Oct. 31, 1990

[87] PCT Pub. No.: WO89/11764
PCT Pub. Date: Nov. 30, 1989

[51] Int. Cl.[5] .................. H04Q 11/04; H04L 12/56
[52] U.S. Cl. .................................. 370/54; 370/60; 370/94.1; 340/826
[58] Field of Search .................. 370/13, 14, 58.1, 60, 370/60.1, 61, 53, 54, 58.2, 58.3, 94.1, 16; 340/825.03, 826, 827, 825.5, 825.51, 825.52, 825.79, 825.8

[56] References Cited

U.S. PATENT DOCUMENTS

| | | | |
|---|---|---|---|
| 4,486,877 | 12/1984 | Turner | 370/15 |
| 4,561,090 | 12/1985 | Turner | 370/60 |
| 4,692,917 | 9/1987 | Fujioka | 370/60 |
| 4,817,085 | 3/1989 | DePrycker | 370/60 |
| 4,965,788 | 10/1990 | Newman | 370/94.1 |
| 5,020,052 | 5/1991 | DePrycker et al. | 370/60 |

FOREIGN PATENT DOCUMENTS 0221360 5/1987 European Pat. Off. .
0274793 7/1988 European Pat. Off. .

OTHER PUBLICATIONS

M. De Prycker and J. Bauwens, "A Switching Exchange for an Asynchronous Time Division based Network," ICC 87, vol. 2/3, Jun. 7-10, 1987, IEEE, pp. 774-781.

Primary Examiner—Douglas W. Olms
Assistant Examiner—Alpus H. Hsu
Attorney, Agent, or Firm—Brunell & May

[57] ABSTRACT

Communication system and switching element used therein. To detect and remove partly established paths, a path release explorer packet is periodically transmitted from an outside node on established paths and each time it arrives in a node a check is made whether this node is a dead end for all directions. In the affirmative a path release packet is transmitted to a preceding node to possibly release the path to the dead end node. The switching element used in each node includes a first switching bus (TB, TM) to interconnect input ports (RX1/8) to output ports (TX1/8). One of these output ports (TX9) is connected to a second switching bus (SB) which has access to all input ports.

25 Claims, 5 Drawing Sheets

COMMUNICATION PROCESS AND SWITCHING ELEMENT FOR CARRYING OUT THIS PROCESS

TECHNICAL FIELD

The present invention relates to a communication process wherein use is made of a communication system with a switching network to establish connections between outside nodes via inside nodes which are each able to interconnect communication paths, wherein at least one of said outside nodes is able to transmit a forward signal in the direction of another outside node via at least one inside node, wherein said one inside node upon the receipt of said forward signal on a communication path either transmits said forward signal on a communication path in the direction of said other outside node or transmits a backward signal on a communication path in the direction of said one outside node, and wherein each node receiving said backward signal releases the communication path connecting it to the node having transmitted the backward signal.

BACKGROUND ART

Such a communication process, and more particularly a packet communication process, is already known in the art, e.g. from Belgian patent no. 905982. Therein the forward signal transmitted by the one outside node is a path setup packet which is used to establish a point-to-point path to the other outside node. Upon the receipt of the path setup packet by an inside node on an input communication path, this node selects a single output communication path in a wanted direction and depending on this selection being successful or not, transmits the packet further or converts it to a backward or so called blocked packet respectively. The blocked packet is transmitted to a preceding node and upon receipt of this packet, this node breaks down its output communication path constituting the above input communication path of the following node.

Because according to this known process a point-to-point path is concerned, the last mentioned input communication path is released if no corresponding output communication path is found in the wanted direction. If the same criterion would be used for a point-to-multipoint path where the input communication path is connected to a plurality of output communication paths in a plurality of directions, the release of this input communication path subsequent to the receipt of a blocked packet would provoke the erroneous release of all the paths. On the other hand, if to avoid such a situation one would use the blocked packet only to inform the outside node having generated the path setup packet that the path setup has been unsuccessful and not as an indication to a node that it has to break down a communication path, the latter would remain in the network as a partly established connection and the last mentioned outside node would not be aware of this fact if, for one or another reason, the blocked packet would get lost.

DISCLOSURE OF THE INVENTION

An object of the present invention is to provide a communication process of the above type, but which prevents partly established paths from remaining in the network and is applicable to both point-to-point and point-to-multipoint paths.

According to the invention this object is achieved due to the fact that said one outside node is able to transmit a path release explorer signal, constituting said forward signal, in the direction of one or more other outside nodes on previously established paths and that each node upon the receipt of said explorer signal on a communication path checks if there are communication paths connected therewith and only in the absence of such paths transmits a path release signal, constituting said backward signal, in the direction of said one outside node.

In this way a partly established connection is able to be released by the path release signal independently of this connection being a point-to-point or a point-to-multipoint one, but only the partly established connections which do not form part of fully established connections are released.

According to the above known communication process at least one of said outside nodes is able to transmit a path setup signal in the direction of another outside node via at least one inside node, and each node subsequent to the receipt of said path setup signal on a path is able either to transmit the path setup signal further on a selected communication path in the direction of said other outside node or to transmit a path setup backward signal in the direction of said one outside node depending on a selected communication path being available or not respectively. When the path setup signal reaches the other outside node, a path setup backward packet, called a confirmation packet, is transmitted to the one outside node to inform the latter node that the setup of the path has been successful. On the contrary, if the path setup packet does not reach the other outside node, a path setup backward packet, a called a blocked packet is transmitted to the one outside node to inform the latter node that the path setup is unsuccessful.

A drawback of this known process is that if either the path setup signal or the path setup backward signal gets lost, the one outside node is not informed of the successful or unsuccessful path setup, so that a partly established path may remain on the network if the path setup backward signal is not used to release the partly established path, Another object of the present invention is to provide a communication process of the above type, but which does not present the last mentioned drawback.

According to the invention this object is achieved due to the fact that said one outside node is also able to transmit a path setup explorer signal in the direction of said other outside node and via at least one inside node on a path previously setup following the transmission of a path setup signal and that each inside node upon the receipt of said path setup explorer signal, checks if there is a communication path connected therewith in said direction and in the absence of such a path transmits a new path setup signal in the direction of said other outside node.

If the previous path setup was successful the one outside node was not aware of this fact because the path setup backward confirmation signal got lost. In this case the new path setup signal will normally reach the other outside node and give rise, as usual, to a new path setup backward confirmation signal. On the contrary, if the previous path setup was unsuccessful or the path setup backward blocked signal got lost, the new path setup signal will normally not reach the other inside node but will end in an inside node and will give rise, as usual, to a blocked signal. Hence, in both cases the one outside node is informed of the state of the path setup operation.

According to the above known communication process use is made of a switching network including a first network part and a second network part which are such that a first path portion established in said first part from one outside node may be extended to any other outside node by a second path portion in said second network part.

A further object of the present invention is to provide a communication process of the above type, and which is adapted to be advantageously used for the establishment of point-to-multipoint connections between outside nodes.

According to the invention this object is achieved due to the fact that said one outside node when having to establish a new path, of a point-to-multipoint connection, towards another outside node, tries to make use of first path portions of this connection previously established in a first network part of said switching network also including a second network part and only when this operation is unsuccessful performs a free selection of a new first path portion in said first network part, said network parts being such that a first path portion (E113/214/314) established in said first part from one outside node may be extended to any other outside node by a second path portion (E444/E42; E44/544) on said second network part.

By making use of previously established first paths, the number of these paths belonging to a point-to-multipoint connection is restricted and the time required to establish new connections is speeded up.

The above mentioned Belgian patent No. 905982 also discloses a switching element for carrying out the above communication process. It includes a first interconnection means for connecting any of a plurality of input ports to any of a plurality of output ports, a control means, and a second interconnection means connected to said control means. The control means is individually associated with to each input port and the second interconnection means interconnect these control means and the output ports. This switching element therefore has a relatively complex structure.

An object of the present invention is to provide a switching element of the above type but having a simpler structure.

According to the invention this object is achieved in that said switching element forms part of a said inside node and includes a first interconnection means for connecting any of a plurality of input ports to any of a plurality of output ports, a control means, and a second interconnection means connected to said control means, at least one of said output ports being coupled to said control means which is provided in common for said input ports and has access thereat through said second interconnection means, the other output ports being each connected to an output link and input links being connected to said input ports, and that said memory is constituted by said first and second memory circuit.

BRIEF DESCRIPTION OF THE DRAWINGS

The above mentioned and other objects and features of the invention will become more apparent and the invention itself will be best understood by referring to the following description of an embodiment taken in conjunction with the accompanying drawings wherein.

BEST MODE FOR CARRYING OUT THE INVENTION

Figure 1:
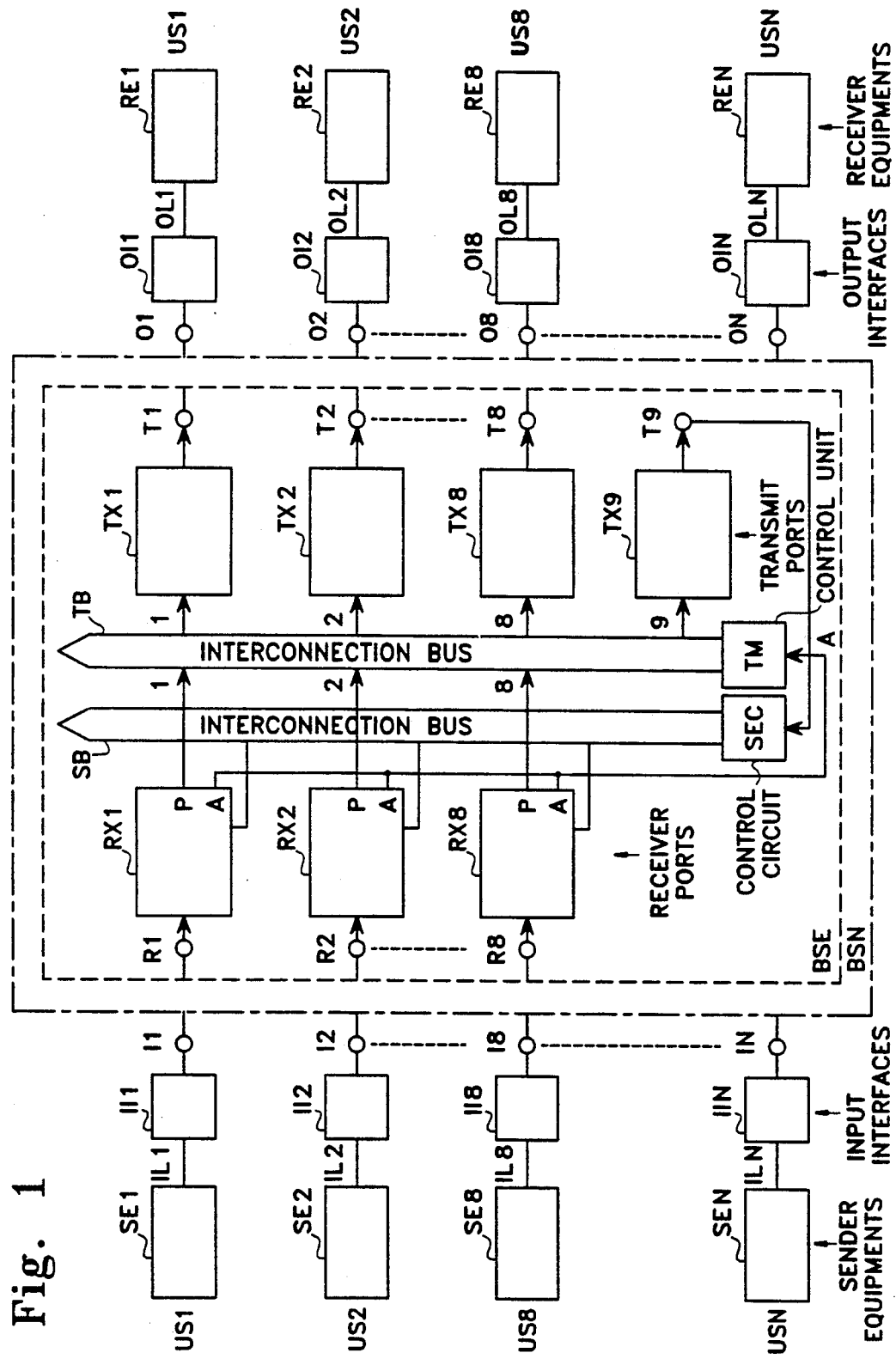
FIG. 1 represents a communication system and a switching element used in a communication process according to the invention.

The communication system shown in FIG. 1 includes a multi-stage broadband packet switching network BSN having a plurality of input terminals I1/N and a plurality of output terminals O1/N, as well as a plurality of user stations US1/N or outside nodes each comprising a sender equipment SE1/N and a receiver equipment RE1/N. The sender equipments SE1/N are coupled to the input terminals I1/N of BSN via respective asynchronous time division (ATD) or asynchronous transfer node (ATM) input transmission links IL1/N and respective input interface circuits II1/N. The output terminals O1/N of BSN are coupled to the receiver equipments RE1/N through respective output interface circuits OI/N and respective ATD or ATM output transmission links OL1/N.

Figure 2:
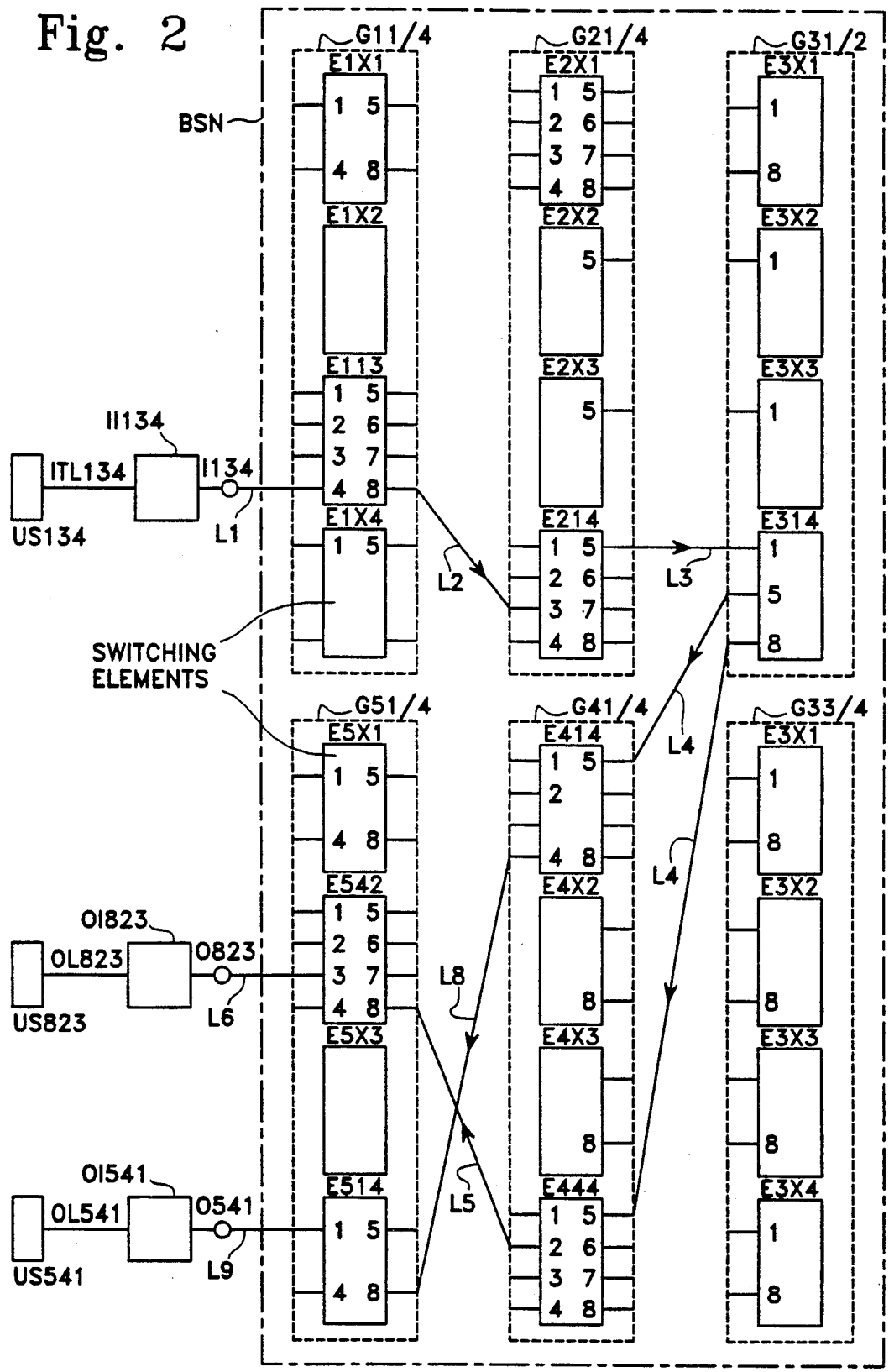
FIG. 2 shows an example of a switching network BSN forming part of the system of FIG. 1.

In the packet switching network BSN the N input terminals I1/N are coupled to the N output terminals O1/N via a number of cascaded stages of switching elements or inside nodes of which only one, BSE, is shown in relative detail. This switching element has 8 input terminals R1/8 connected to respective output terminals of a preceding stage via multiplex input links (not shown) and 8 output terminals T1/8 connected through multiplex output links (not shown) to respective input terminals of a following stage (not shown). This means that the switching element BSE may be considered as having 8 bidirectional terminals R1/T1 to R8/T8 each connected to a bidirectional multiplex link on which a plurality of communication paths may be multiplexed. In FIG. 2 these pairs of terminals are indicated by the numerals 1 to 8. Inside the switching element BSE the input terminals R1/8 are connected to respective input or receive ports RX1/8 which have a packet output P and an address output A and which are further connected through an interconnection bus SB to a switching element common control circuit SEC. The packet outputs P are connected to inputs 1/8 of a Time Division Multiplex (TDM) interconnection bus TB which is controlled by a control unit TM to which the address outputs A of the receive ports RX1/8 are connected. Eight outputs 1/8 of the bus TB are connected through respective output or transmits ports TX1/8 to respective output terminals T1/8 and a ninth output 9 is connected to the control circuit SEC via a transmit port TX9 having terminal T9.

An example of a switching network BSN is represented in FIG. 2. and it is a folded one, with both the input and output terminals on one (left) side and a mirror plane at the other (right) side. Between a terminal used as input and the mirror plane, BSN is a distribution network where the path selection may be performed freely, whereas between the mirror plane and a terminal used as output it is a routing network wherein the path is predefined. A path selected in the distribution network may be extended in the routing network to any of the outputs.

The switching network BSN is of the type shown in the above mentioned Belgian patent No. 905982 and includes three stages of switching elements whose terminals 1/8 each represent both a receive terminal R1/8 and a transmit terminal T1/8. These three stages of switching elements can be used to interconnect a terminal used as input with a terminal used as output through as many as five stages. While the third stage on the mirror side comprises four groups G31 to G34 each with four elements E311/314 to E341/344, the first and second stages each include eight groups each also with four elements. Merely to illustrate a possible connection through five stages, the groups of the first stage have been labelled G11 to G14 and G51 to G54 and likewise for G21 to G24 and G41 to G44 constituting the second stage. Thus, with only groups G11, G21, G31, G34, G41 (in part) G44 (in part) G51 (in part) and G54 (in part) shown on FIG. 2, a possible 5-stage connection involving links L2, L3, L4 and L5 passes through G11 and G54 both of the first switching stage but G11 being used as the first stage of this particular connection and G54 as the fifth. Likewise, and a connection passes through G21 and G44 both of the second switching stage but with G21 as the second stage of this particular connection and G44 as the fourth. But such 5-stage connections in a folded network may also involve only G11 to G14 or only G51 to G54 in the first stage and likewise for G21 to G24 or G41 to G44 in the second. The interconnection between the groups and the elements is such that the first group of the first stage can only access the first groups of the second stage and likewise for the remaining 7 groups in these two stages. For each such pair of groups, each of its 4 elements has access to the 4 elements of the paired group. Since there are only 4 groups in the stage, the 8 terminals of each of its 4×4 switching elements can be associated with 4 terminals of each of the 8 groups of 4 switching elements of the second stage also on a one to one basis, each element of the second stage having access to all groups of the third stage and vice-versa.

Figure 3:
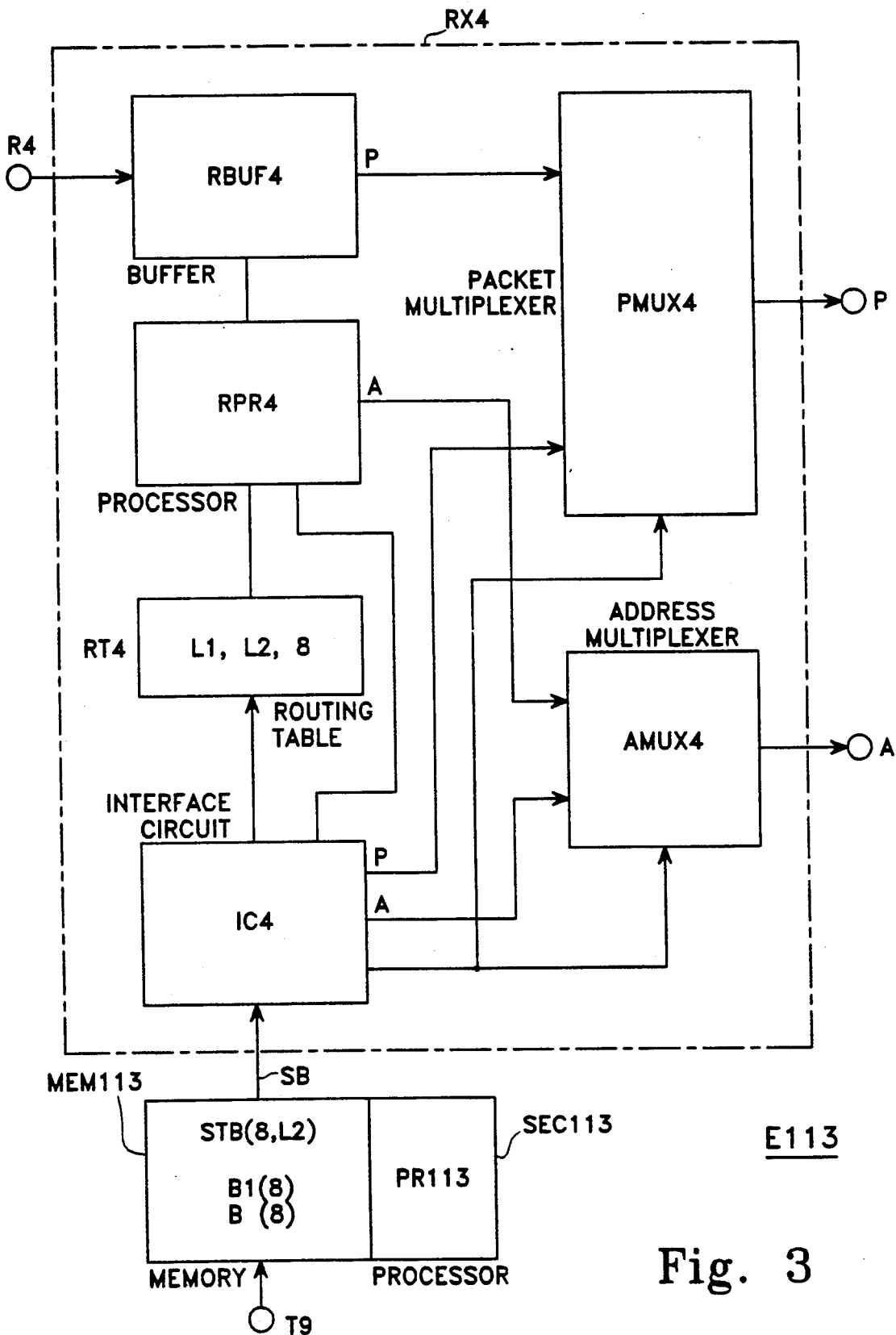
FIG. 3 represents part of a switching element E113 of FIG. 2 in more detail.
Figure 4:
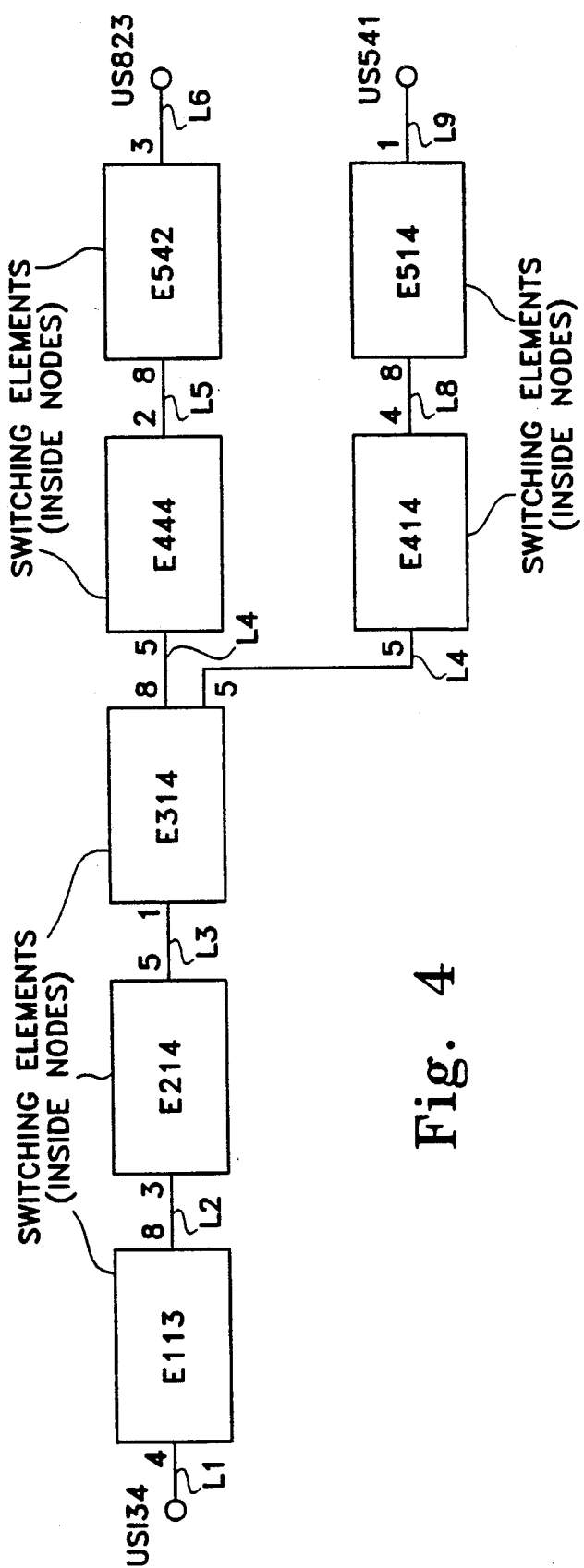
FIG. 4 represents a point-to-multipoint path established through the switching network BSN of FIG. 2.

FIG. 3 shows in more detail the receive port RX4 and the switching element control circuit SEC113 both forming part of the switching element E113 of FIG. 2.

The receive port RX4 includes a receive buffer RBUF4, a processor RPR4, a routing table RT4, an interface circuit IC4, a packet multiplexer PMUX4 and an address multiplexer AMUX4. The above mentioned bus SB is connected to the interface circuit IC4 which has access to the processor RPR4 and to routing table RT4 and the latter table is coupled to the processor RPR4 which has access to the buffer RBUF4. The buffer RBUF4 has a packet input R4 and a packet output P which is connected to an input of the packet multiplexer PMUX4. A packet output P of the interface circuit IC4 is connected to another input of PMUX4. The processor RPR4 and the interface IC4 further have address outputs A which are connected to respective inputs of the address multiplexer AMUX4. The multiplexers PMUX4 and AMUX4 are controlled by the interface circuit IC4. The outputs P of the multiplexer PMUX4 and A of the multiplexer AMUX4 constitute the outputs of the receive port RX4.

The switch element control circuit SEC113 includes a processor PR113 and an associated memory MEM113 which stores:

for each of the communication paths on an output multiplex link or output terminal of E113, a status bit the purpose of which will be explained later. For instance STB (8, L2) is a status bit allocated to the communication path with label L2 on the output terminal or link 8 of the switching element E113;

for each of these output multiplex links or output terminals the calculated estimated bandwith (or traffic load counter position) and the maximum bandwidth allowable on the link. For instance, B1(8) and B(8) are the calculated estimated bandwith (or traffic load counter position) and the maximum allowable bandwidth on the output terminal or link 8 of the switching element E113. The use of these parameters is explained at length in the Belgian patent No 08701481 (W. Verbiest 3) and will become clear later;

tables (not shown) allowing the processor PR113 to select communication paths in the switching element and to allocate labels to these paths.

Figure 6:
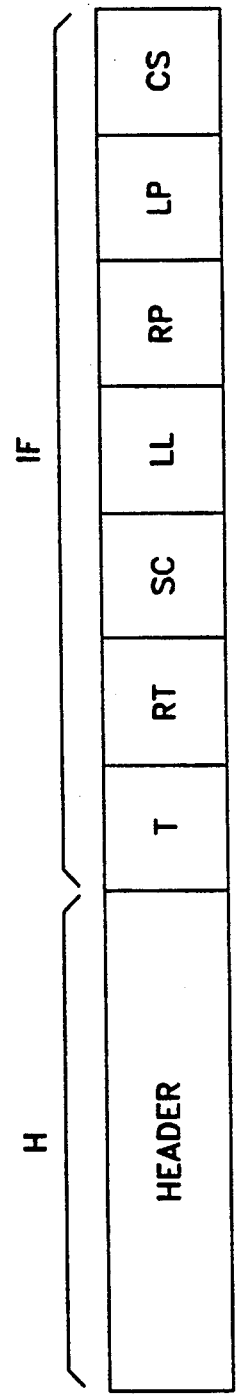
FIG. 6 shows the structure of a control packet used in the system of FIG. 1.

In the present system use is made of control packets and of data packets. The structure of a control packet is schematically represented in FIG. 6. It includes a header H and an information field IF. The header H identifies the packet, i.e. a data packet or a control packet, and includes a header error checking code. In the information field IF:

T: is the type of packet, e.g. a point-to-point path set-up control packet;

RT: is a routing tag containing for instance five sets of 4 bits. Each set defines a respective one of the 16 terminals or links of a switching element and the sets are associated with to respective switching elements of the five stages via which a connection may be established;

SC: is a selection code indicating for each of the terminals of RT if the selection thereof has to be performed freely (FS) or is fixed (F);

LL: are labels identifying the communication paths on the links of a connection;

RP: is the identity of a return path in the network;

LP: are traffic load parameters, e.g. the average and variance, characterizing a packet stream, as described in the above Belgian patent 8701481;

CS: is a check sum to check the contents of the information field.

A data packet includes a header constituted by a label identifying the communication path used on the link on which the packet is transmitted and an information field which comprises data.

The control packets used for point-to-point paths are of the following types:

a point-to-point path setup packet which is generated by an originating user station to set up a virtual path through the network BSN;

a point-to-point confirmation packet which is returned from a destination user station to the originating user station to inform the latter that the setting up of a virtual path has been successful;

a point-to-point blocked packet which is returned from an inside node to the originating user station to inform the latter that the setting up of a virtual path has been unsuccessful. This packet also breaks down or releases the then partly established path and updates traffic load counters in the control circuits of the switching elements or nodes forming part of this path;

a point-to-point clear packet which is used to break down a previously established path;

a point-to-point explorer packet of the path setup type which is generated by the originating user station and transmitted along the same path established by an immediately preceding path setup packet and which is converted either to a new path setup packet when a dead end, i.e. the switching element at the end of a partly established path, is detected or to a confirmation packet when a destination user station is reached;

a point-to-point explorer packet of the clear type which is generated by the originating user station and transmitted along an established path and which is converted to a clear packet.

These packets, except the explorer packets, are of the type described in the above mentioned Belgian patent No 905982.

In the case of a point-to-multipoint communication use is likewise made of point-to-multipoint path setup packets, confirmation packets, blocked packets and explorer packets of the setup type. However, a point-to-multipoint blocked packet then only has the purpose of informing the originating user station that the establishment of a path was not successful and is not used to break down such a partly established path, as is the case for a point-to-point blocked packet.

Additionally use is made of a point-to-multipoint explorer packet of a path reduction or release type which is generated by the originating user station and which is transmitted along all the paths of a point-to-multipoint path to detect dead ends, i.e. partly established paths, and which is converted into a path reduction or release packet in case a partly established path is detected to release this path.

Reference is now made to FIGS. 2 to 5 for the description of the establishment of a point-to-multipoint communication between an originating user station US134 and two destination user stations US823 and US541. First the path between US134 and US823 and then that between US134 and US541 is established.

To establish the first path the user station US134 launches a point-to-multipoint path setup control packet which contains, amongst others which are not considered, the following fields:

RT: X, X, 8, 2, 3

SC: FS, FS, F, F, F

LL: L1, X, X, X, X, X

RP: X, X, X, X, X with

X = undetermined;
FS = free selection;
F = fixed.

This means that for the path to be established, the selection of the output link to be used is free in the first and second stages of the network, that the output links 8, 2 and 3 whose identities are stored in the packet have to be used in the following three stages of this network, and that the label L1 is to be used for the communication path on the link interconnecting US134 and the first stage of the network.

When this packet is received on the input terminal R4 or input link 4 (FIG. 2) of the receive port RX4 of the switching element E113 (FIG. 3), it is entered in the receive buffer RBUF4 thereof under the control of the processor RPR4. This processor then reads the header H of the packet and because the packet is a control packet it performs the following operations:

it writes the address 4 of the input terminal or input link 4 (or R4) on which the packet is received and of which the corresponding output link has to be used by a return or backward packet, in the first position of the return path field RP of the packet, so that this field becomes:

RP: 4, X, X, X, X and then supplies this packet from RBUF4 to the packet multiplexer PMUX4;

via its address output A it applies the address 9 of the output terminal or output link T9 of the transmit port TX9 to the address multiplexer AMUX4;

The processor RPR4 then controls the interface circuit IC4 in such a way that the latter operates the multiplexers PMUX4 and AMUX4. As a consequence, from these multiplexers the path setup packet is supplied via the output P to the input 4 (not shown) of the bus TB and the address is communicated via the output A to the control unit TM of this bus TB. As a result the control unit TM connects the input 4 of TB to the transmit port TX9 and transmits the packet thereto. The latter then supplies the packet to the switching element control circuit SEC113 via its output T9.

Upon the receipt of the point-to-multipoint path setup control packet in the control circuit SEC113, the processor PR113 thereof performs the functions described hereinafter.

This processor PR113 selects an output terminal or output link of the switching element E113, e.g. T8 or 8, on which the path setup packet, and later the data packets following it, have to be transmitted to the second stage of the switching network.

In the way described in the above Belgian patent No. 08701481 the processor PR113 calculates the new estimated bandwith on this link by means of the previous estimated value B1(8) stored in MEM113 and the traffic load parameters LP contained in the packet. It then checks if the new estimated bandwidth is smaller or larger than the maximum allowable bandwith B stored in MEM113 and accordingly allows the control packet to be multiplexed on the selected output link 8 or refuses to do so. In the latter case the processor selects another output link and performs similar calculations, etc. In this way either a suitable output link, i.e. a suitable communication path thereon, is found or not and in the latter case the switching element E113 is considered to constitute a blocked end for the communication under consideration. In the following it is supposed that E113 is not a blocked end and that output link 8 may be used.

Under this assumption the processor PR113 selects in MEM113 a new label L2 to indicate the selected communication path on this output link 8.

The processor PR113 also resets the status bit STB(8, L2) in MEM113 to indicate that a path setup control packet with label L2 will be transmitted on a communication path of the output link 8.

The processor PR113 also writes in the routing table RT4 of the receive port RX4, the routing information or relationship L1, L2, 8 linking the input communication path with label L1 on input link 1 with the output communication path with label L2 on output link 8. This happens via the bus SB and the interface circuit IC4 of this port.

The processor PR113 finally also modifies the contents of the path setup packet by writing 8 and L2 in the first positions of the fields RP and L respectively, by changing FS in the first position of SC by F and by then subjecting RT and SC to a circular shift in anti-clockwise direction. Thus the fields of the packet become:

RT: X, 8, 2, 3, 8

SC: FS, F, F, F, F

LL: L2, L1, X, X, X, X

RP: 4, X, X, X, X

The thus modified packet and the address 8 are then transmitted via the bus SB to one of the receive ports RX1/8 e.g. to RX4 and more particularly to the interface circuit IC4 which supplies the packet to the packet multiplexer PMUX4 and applies the address 8 to the address multiplexer AMUX4 via its outputs P and A respectively. Under the control of IC4 the packet is then transmitted from these multiplexers and via the bus TB to the transmit port TX8. By this transmit port TX8 it is afterwards transmitted on the output link 8 of E113 to the input terminal 3 of the switching element E214 where operations similar to those described above are executed, etc. Thereby the fields RT, SC, LL and RP of the packet are modified as follows in the switching elements or inside nodes E214, E314, E444 and E542 if these nodes are not found to be dead ends and before being transmitted therefrom to a following node:

RT: 82385; 23858; 38582; 85823

SC: FFFFF; FFFFF; FFFFF; FFFFF

LL: L3L2L1LXXX; L4L3L2L1XX; L5L4L3L2L1X; L6L5L4L3L2L1

RP: 34XXX; 134XX; 5134X; 85134

Figure 5:
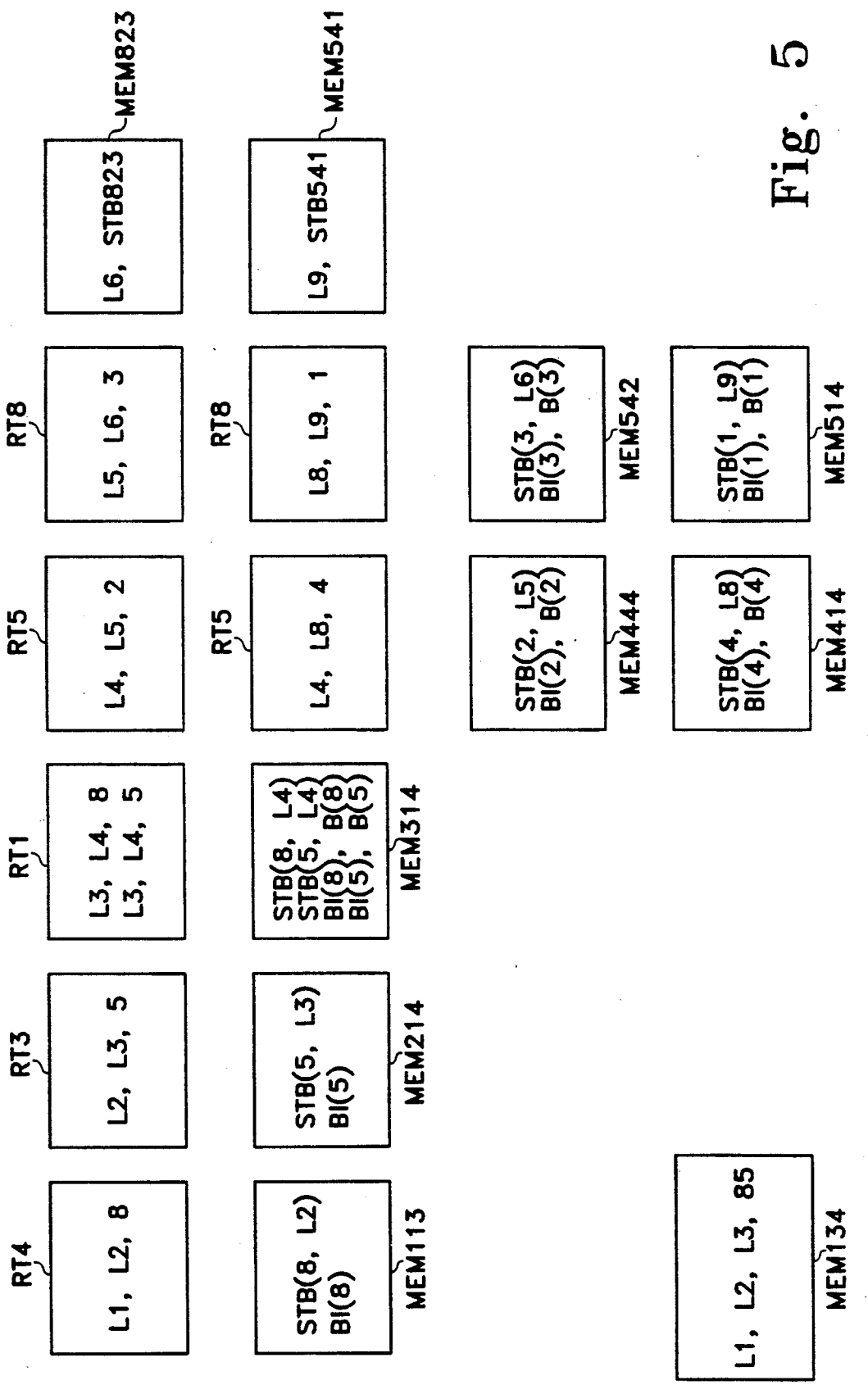
FIG. 5 represents data stored in routing tables and memories.

In this way the first connection of a point-to-multipoint path shown in FIGS. 2 and 5 has been established. To be noted that this connection is similar to that described in the above mentioned Belgian patent No 905 982. This connection is as follows: user station US134, link IL134 on which the communication label L1 is used, II134, R4 and T8 of E113, output link 8 on which the label L2 is used, R3 and T5 of E214, output link 5 on which label L3 is used, R1 and T8 of E314, output link 8 on which label L4 is used, R5 and T2 of E44, output link 2 on which label L5 used, R8 and T3 of E542, OI823 and output link OL823 on which label L6 is used.

FIG. 5 also represents routing tables and control circuit memories included in the switching elements or inside nodes E113/214/314/444/542 as well as data stored therein. Upon the arrival of the packet in the destination user station US823 the processor thereof also stores in an associated memory MEM823 the relationship between the label L6 and a special status bit STB823 which may be put in the set condition station to indicate that it is a dead end and wants the connection of which it forms part to be released, as well as explained later.

In this destination user station US823 the point-to-multipoint path setup control packet is converted to a confirmation packet which is intended to inform the user station US134 of the successful path setup and which contains, amongst others, the following information fields obtained from the fields RP and LL of the path setup packet previously received:

RT: 8 5 1 3 4

LL: L6L5L4L3L2L1

This packet is transmitted as a return or backward packet and with the appropriate label to the originating user station US134 through the successive elements E542/444/314/214/134 in a way similar to that described for the path setup packet. As a consequence, when arriving in this user station US134 the return path field RP and the label field LL of this packet are as follows:

RP: 8 5 8 2 3

LL: L1L2L3L4L5L6

The information L1,L2,L3,8,5 is stored in the memory MEM134 of US134. It defines the portion of the path, in the distribution part of the network, which has preferably to be used when another path of the point-to-multipoint communication has to be established. This is possible because any user station may be reached from the mirror plane of the network, as already mentioned above.

In case the above mentioned comparison between the estimated bandwidth and the maximum allowable bandwidth on an output terminal or link indicates that the path setup packet, and the data packets which will follow the packet, cannot be transmitted further from one of the intermediate nodes E113/214/314/444/542, i.e. in case one of these nodes is a dead end for the input communication path considered, the path setup packet is converted to a so called blocked packet which is then returned to the originating user station US134 in a similar way as for a confirmation packet. This blocked packet is solely intended to inform the user station US134 that the path setup was unsuccessful. As a consequence, in case of an unsuccessful path setup a partly established path may remain in the switching network.

When within a predetermined time interval after the transmission of the path setup packet the user station US134 receive neither a confirmation packet nor a blocked packet, it concludes therefrom that something has gone wrong, e.g. that these packets or the path setup packet itself got lost, and it therefore launches a so-called point-to-multipoint explorer packet of the path setup type to the user station US823 and along the same path as the preceding path setup packet. The purpose of this explorer packet is to detect if the error was due to the presence of a dead end in the wanted direction towards US823 or not. In the affirmative it will be converted to a normal path setup packet which will then be followed, later on, by confirmation packet or by a blocked packet. The explorer packet has, amongst other fields, the following fields:

RT: X, X, 8, 2, 3

SC: FS, FS, F, F, F

LL: L1, X, X, X, X, X

RP: X, X, X, X, X

When this explorer packet is supplied to the input terminal R4 of the switching element E113 the processor RPR4 included in the receive port RX4 (FIG. 3) thereof checks if this switching element E113 is a dead end or not for the input communication path with label L1 on input link 4, by consulting by means of this label L1 the routing table RT4 associated to this link 4. Indeed, only if this table stores a relationship between L1 and an output communication path characterized by another label, e.g. L2, and an output link, e.g. 8, the switching element E113 is not a dead end for the input communication path and the direction considered.

When the switching element E113 is a dead end for the input communication path and in the direction considered, the processor RPR4 transfers the packet to the switching element control circuit SEC113 where the explorer packet is then converted to a normal path setup packet which is then processed in the way already described above.

On the contrary, when the switching element E113 is not a dead end for the input communication path and in the direction considered, the processor RPR4 changes the contents of the explorer packet by making use of the contents L1, L2, 8 of the routing table RT4 and of the identity 4 of the input terminal of E113. This happens in a similar way as described above for the path setup packet, and the modified explorer packet therefore has the following fields before being transmitted to E214:

RT: X, 8, 2, 3, 8

LL: L2, L1, X, X, X

RP: 4, X, X, X, X

This explorer packet is transmitted to the switching element E214 on the output link 8. In the switching element E214 it is then again checked if this element is a dead end or not for the input communication path and in the direction considered, etc.

In connection with the above it is clear that if the explorer packet of the path setup type was launched by the user station US134 due to the loss of a confirmation packet the explorer packet will normally reach the destination user station US823. There it is then converted to a confirmation packet which is transmitted to the originating user station US134. On the contrary, if the explorer packet of the setup type was launched by the user station US134 because no blocked packet was received, due to the loss of this packet or due to the loss of the path setup packet itself, the explorer packet will normally find a dead end for the communication path considered and therefore be converted to a normal path set up packet.

When the user station US341 wants to participate in the point-to-multipoint communication of which the path to US823 has already been established, it communicates this wish to the former one in a not shown way. The station US134 then launches a second point-to-multipoint path setup control packet in the direction of the user station US341. To limit the number of switching elements used in a point-to-multipoint connection this packet should preferably follow the portion of the connection or common branch already used previously in the distribution network part and defined by the labels L1, L2, L3 and the links 8 and 5 stored in the memory MEM134 of US134. This information is therefore used to build up the second path setup packet in such a way that the latter then contains the following information fields, amongst others:

RT: 8 5 3 4 1

RP: X X X X X

For simplicity reasons it is assumed that the use of the above mentioned portion by the second path setup packet will not lead to dead ends.

Subsequent to the receipt of this second point-to-multipoint path setup packet, and in the same way as for the above described first one, the various routing tables in the switching elements and the memories in the associated control circuits are updated, as indicated, except for those associated to the switching elements E113 and E214 which do not have to decide on the multiplexing of the path setup packet and of the data packets which will follow it. Indeed, the data packet stream to be transmitted to the destination user station US341 is already transmitted on the portion of the connection involving the output links 8 and 5 of E113 and E214.

It is clear that when the second path setup packet not only uses the switching elements E113, E814 and E314 but also the switching element E444 in the routing part of the network, no updating has to be performed for this switching element E444.

The above path establishment operation may again be successful or not and accordingly give rise to the transmission in the direction of the originating user station US134 either of a confirmation packet by the destination user station US541 or of a blocked packet by one of the inside nodes E113, E214, E314, E414, E514. As already mentioned above a partly established path may therefore remain in the network.

When the user station US134 receives neither a confirmation packet nor a blocked packet within a predetermined time interval it launches a point-to-multipoint explorer packet of the path setup type, in the same way as already described above.

Independently from the launching of the last mentioned explorer packet of the path setup type, the originating user station US134 launches on previously established paths an explorer packet of the path reduction or release type periodically, and also upon request of one of the nodes involved in the point-to-multipoint path, with the purpose of detecting and releasing partly established paths and even of completely established paths.

As an example it is supposed that the switching element E414 was not able to establish an output communication path to the switching element E514 and therefore constitutes a dead end for the input communication path L4, 5 in the direction of US541. For this reason no relationship linking the label L4 to the identity of an output link of E414 has been stored in the routing table RT8 of the element E414. As a consequence a blocked packet was possibly sent towards the user station US134 and was received therein or not, but anyhow a partly established path between US134 and E414 remained in the network.

The above mentioned explorer packet of the path reduction or release type launched by US134 contains, amongst others, the following fields:

RT: X X X X X

LL: L1 X X X X X

RP: X X X X X

When this explorer packet of the path release type is supplied to the input terminal R4 of the switching element E113 the processor RPR4 included in the receive port RX4 (FIG. 3) thereof checks if this switching element E113 is a dead end or not for the input communication path L1, 4 and in all directions, by checking if the table RT4, associated to the link 4, stores a relationship between the label L1 and an output communication path characterized by a label and the identity of an output link.

Because the switching element E113 is not a dead end for the input communication path coupled to it, as L1, L2, 8 is stored in RT4, the processor RPR4 changes the contents of the explorer packet by making use of the contents L1, L2, 8 of the table RT4 and of the identity 4 of the input link 4 of terminal E113. This happens in a similar way as described above for the path setup packet and the modified explorer packet then has the following fields before being transmitted to E214 on the output communication path L2, 8 of the output link 8:

RT: X, X, X, X, 8

LL: L2, L1, X, X, X

RP: 4, X, X, X, X

LP

The processor RPR4 also sets the status bit STB (8, L2), associated to this output communication path L2, 8, in the memory MEM113 of the control circuit SEC113 via the interface IC4 and the bus SB to indicate that this communication path is involved in a path release explorer operation. In the switching element E214 it is then again checked if this element is a dead end or not for the input communication path and in all directions. Because this is not so, the status bit STB (5, L3) of the output communication path L3, 5 on the output link 5 is set in MEM214 of SEC214 and the explorer packet is modified and transmitted to the switching element E314. There the explorer packet received on the input communication path L3, 1 is converted to two packets with the same label L4, to be transmitted on the output communication path L4, 8 on the output link 8 as well as on the output communication path L4, 5 on the output link 5. These packets wherein:

| RP | X X 8 5 8 | and | RP X X 8 5 3 |
| LL | L4L3L2L1 X | | LL L4L3L2L1 X |
| RP | 1 3 4 X X | | RP 1 3 4 X X | are transmitted to the switching elements E444 and E414 respectively. In E314 also the status bits STB(8, L4) and STB(5, L4) associated with the last mentioned output communication paths are set in the memory MEM314 thereof.

When the above mentioned path reduction explorer packet is supplied to the switching element E414 the processor included in the receive port connected to the input terminal R5 thereof modifies the field RP of the packet by inserting the identity 5 of the input link 5 therein. RP thus becomes:

RP: 5 1 3 4 X

It then checks if the switching element E414 is a dead end or not for the input communication path and in all directions by consulting the routing table RT8 (FIG. 4), included therein, by means of the label L4. Because no relationship between the label L4 of the input communication path L4, 5 and an output communication path characterized by another label and an output link is stored in this table—as previously assumed—the switching element E414 is a dead end. The processor of E441 therefore transfers the explorer packet to the switching element control circuit SEC414 (not shown). Therein the processor of this circuit converts the packet to a path release packet by using the information stored in the fields of the path release explorer packet in such a way that the former packet therefore contains, amongst others, the following fields:

RT: 5 1 3 4 X

LL: L4L3L2L1X

Before being transmitted to E314 on the output communication path L4, 5, on the output link 5 of E441 and with label L4, the packet is modified as follows:

RT: 1 3 4 X 5

LL: L3L2L1XL4

The purpose of this packet is to give rise in E314 to the release of the output communication path L4,5 on which the explorer packet was transmitted to E414 and which was connected in E314 to the input communication path L3, 1 indicated by the fields LL and RT of the path release packet. However, this release is only done if the status bit STB (5; L4) associated to this output communication path and stored in MEM314 is in the set condition. To be noted that the packet itself does not affect the status bits.

In E314 the packet is received on the input communication path L4, 5 on the input link 5 thereof and is transmitted to the control circuit SEC314 (not shown) of this switching element. The processor thereof checks if the status bit STB (5, L4) associated to the communication path L4, 5 on the link 5 is in the set condition or not indicating that the output communication path on which the explorer packet was transmitted from E314 to E414 may be released or not respectively:

in the negative, the packet is discarded;
in the positive, the processor updates the load counter B1(3) associated to the link 5 and stored in the memory MEM314 and finds the routing table RT1 by means of the identity of the terminal 1 stored in the routing field RT of the packet. It interrogates this table by means of the label L4 and finds therein the information L3, L4, 8 and L3, L4, 5. Because the output communication path L4, 5 has to be released, it removes the relationship L3, L4, 5. But since the presence of L3, L4, 8 indicates that E314 is not a dead end for the input communication path L3, 1 the packet is then discarded.

If the switching element E314 would have been a dead end, the path reduction packet would have been transmitted further to E214 and therein the path between E214 and E314 would have been removed by deleting the relationship L2, L3, 5 in the routing table RT3 of E214, etc.

Considering again the path between US134 and US823, since the switching elements E444 and E542 are not dead ends the explorer packet is modified therein and transmitted further so that it finally arrives in the user station US823. Also the status bits STB(2, L5) and STB(3, L6) are set in the respective switching elements E444 and E542. Upon its arrival in US823 the explorer packet is discarded if the status bit STB823 thereof is in the reset condition indicating that it is not a dead end and does not want the communication to be released. Otherwise this packet is converted to a path release packet in the same way as described above for E414.

Summarizing, from the above it follows that the establishment of a point-to-multipoint path may give rise to partly established paths and that such paths are detected by a point-to-multipoint path release explorer packet and then broken down by a path release packet on condition that this is allowed by a status bit. The path release packet is discarded if the status bit is in the reset condition and also, after the removal of the path in a switching element, if this switching element is not a dead end. Also the traffic load counter associated to the link used for the communication is updated.

As described above the point-to-multipoint path release explorer packet sets the status bit in a memory to 1 if it is not yet in that condition, whilst the path release packet breaks down a path only if the status bit is on 1 and never modifies this bit. This procedure is used to avoid the following conflicting situation: if such a path release explorer packet arrives in a node, e.g. E414, prior to a path setup packet and along a same (bidirectional) link and if the path explorer packet is converted to a path release packet which breaks down the path, e.g. between E414 and E314, whilst the path setup packet establishes a path between this node, e.g. E414, and a following one, e.g. E514, a path is created which begins in the node considered, e.g. E414. This is obviously an erroneous situation.

The function of a point-to-point path setup packet is the same as that of a point-to-multipoint path setup packet when involved in the establishment of a first path of the point-to-multipoint path. Therefore this function is not again described.

A point-to-point clear explorer packet is transmitted along the previously established path and in each node or switching element of this path it is checked if the element is a dead end or not in an analogous way as described above for a path setup explorer packet. In the affirmative, the explorer packet is converted to a point-to-point clear packet unconditionally to break down the path, i.e. without taking the status bit into account. In the negative, the explorer packet is transmitted to the following switching element of the path, etc. When it finally arrives in a destination user station it is converted to a point-to-point clear packet to unconditionally break down the path.

Returning to the establishment of paths through the switching network, when—as described above—the originating user station US134 has to establish a new path of a point-to-multipoint connection, e.g. towards the destination user station US541, it tries to do so by making use of the common branch E113/214/314 in the distribution network part already used for the connection between US134 and US823. When in this case a blocked packet is received the station US134 concludes therefrom that the path towards the station US541 is blocked. It therefore launches another path setup packet which again performs a free selection in the distribution network part, just as the one which was used to establish a path between US134 and US823. When this path setup is successful, it is clear that the point-to-multipoint connection then established comprises two common branches in the distribution network part. If now a further part of the point-to-multipoint connection has to be established from the station US134, the latter tries to do so first by using the common branch E113/214/314 which was established first, then by using the common branch secondly established if the first try is not successful, etc. In other words the various previously established common branches are tried in the predetermined order in which they were previously established. By respecting this order, one avoids the extensive use of all other common branches than the first established one. As a consequence of their restricted use, those other common branches will statistically remain established for a smaller time than the first common branch. Hence the number of established common branches in the network will always be restricted.

While the principles of the invention have been described above in connection with specific apparatus, it is to be clearly understood that this description is made only by way of example and not as a limitation on the scope of the invention.

We claim:

1. A switching network comprising
    a plurality of switching nodes including first and second inside nodes and first and second outside nodes,
    interconnecting means for selectively establishing a plurality of interconnected communication path segments including an upstream said communication path segment connecting an inside node to an upstream switching node, and a downstream said communication path segment connecting the inside node to a downstream switching node, to thereby form a communication path extending in a downstream direction from the first outside node to the second outside node and extending in an upstream direction from the second outside node to the first outside node,
    exploring means associated with the upstream switching node for transmitting a path release explorer signal in the downstream direction via a previously established said upstream communication path segment,
    path checking means associated with the inside node and responsive to the reception of said path release explorer signal on said previously established upstream communication path segment for checking for any established said downstream communication path segments, and for selectively either transmitting said path release explorer signal in said downstream direction via a previously established said downstream communication path segment or for transmitting a path release signal in the upstream direction via said previously established upstream communication path segment if no such established downstream path segments exist, and
    upstream node releasing means associated with the upstream switching node and responsive to the reception of said path release signal on said upstream communication path segment for releasing said upstream communication path segment.

2. A switching network according to claim 1, wherein
    each said inside node further comprises a respective memory for storing, for each connected pair of established said upstream and downstream communication path segments, respective parameters identifying the upstream and downstream communication path segments of said each connected pair, and each said inside node decision means is responsive to at least some of the parameters stored in the respective memory.

3. A switching network according to claim 2, wherein said upstream node releasing means of an upstream inside node releases said upstream communication path segment in response to said path release signal transmitted on said upstream communication path segment, by removing from its respective said memory the relationship whose parameters identify said upstream communication path segment.

4. A switching network according to claim 2, wherein the communication path segments of each said connected pair are established on respective input and output multiplex links, and said parameters comprise a first label identifying the upstream communication path segment on said input multiplex link, a second label identifying the downstream communication path segment on said output multiplex link, and a third parameter identifying said output multiplex link on which the downstream communication path segment is established.

5. A switching network according to claim 4, wherein two downstream communication path segments are connected to a common upstream communication path segment, and said two downstream communication path segments have a same label.

6. A switching network according to claim 4, wherein said upstream node, subsequent to the receipt of said path release signal, only releases said communication path segment if said upstream path segment is not involved in a path setup operation, and the memory of each said inside node stores, for each communication path segment on an output multiplex link of said each inside node, a status bit which is put in a first condition by said path release explorer signal which is not affected by said path release signal, and which is put in a second condition if said communication path segment is involved in a path setup operation.

7. A switching network according to claim 6, wherein said first outside node further comprises means for transmitting a path setup signal in the direction of said second outside node via said inside node, and said inside node further comprises means for setting the status bit allocated to the downstream communication path segment on an output multiplex link in said second condition, thus indicating that the downstream path segment is involved in a path setup operation.

8. A switching network according to claim 6, wherein each said inside node memory stores, for each output multiplex link thereof, traffic load parameters for determining whether said inside node allows a communication path segment to be multiplexed on this multiplex link or not, and said traffic load parameters are updated when said communication path segment is allowed to be multiplexed on said multiplex link and again when it said communication path segment is released.

9. A switching network according to claim 1, wherein said second outside node further comprises a memory for storing a status bit which, when in a predetermined condition, indicates that the node has no downstream communication path segment connected to the upstream communication path segment on which the path release explorer signal was transmitted.

10. A switching network according to claim 1, wherein said first outside node regularly transmits said path release explorer signal on all path segments established from said first outside node.

11. A switching network according to claim 1, wherein said first outside node transmits said path release explorer signal in response to a request from one of the other switching nodes.

12. A switching network according to claim 1, wherein said upstream node, subsequent to the receipt of said path release signal, only releases said upstream communication path segment if said upstream path segment is not involved in a path setup operation.

13. A switching network according to claim 1, wherein said first outside node further comprises means for transmitting a path setup explorer signal in the direction of said second outside node via at least one said inside node on a path segment previously setup following the transmission of a path setup signal, and each said inside node further comprises means, responsive to the receipt of said path setup explorer signal on an upstream established path segment, for checking if there is an established downstream communication path segment connected therewith and, in the absence of such an established downstream path segment, for transmitting a new path setup signal in the direction of said second outside node.

14. A switching network according to claim 13, wherein said first outside node transmits said path setup explorer signal at a predetermined time interval after the transmission of said path setup signal if a path setup backward signal indicating that no communication path segment is found is not received within said time interval.

15. A switching network according to claim 14, wherein said path setup backward signal transmitted by an inside node in case no communication path segment is found, does not release the path segment already established towards said first outside node.

16. A switching network according to claim 1, wherein said signals are packets of information.

17. A switching network according to claim 1, wherein said switching network comprises first and second network parts associated respectfully with said first and second outside nodes and connected by a common switching stage, said second network part can connect any inside node in said common switching stage to any outside node in said second network path, said second outside node is in said second network part, said first outside node further comprises additional path means for establishing an additional downstream path segment of a point-to-multipoint connection from said first outside node to a third outside node also in said second network part and associated with an established connected between said first outside node and said second outside node, and said additional path means attempts during a first path establishing operation to complete the connection between the first outside node and the third outside node using the connection segments in the first network part previously established for the connection to the second outside node, and when the first path establishing operation is unsuccessful, performs a free selection of a new first path segment portion in said first network part of said switching network.

18. A switching network according to claim 17, wherein said previously established path segments are tried in the order in which they were established.

19. A switching network according to claim 1, wherein
each said inside node further comprises at least one switching element, each said switching element further comprising
first interconnection means for connecting any of a plurality of external input ports to any of a plurality of external output ports or to an internal output port,
a common control means responsive to said internal output port, and
second interconnection means responsive to said common control means for connecting an output of said control means to a control input of any of said input ports.

20. A switching network according to claim 19, wherein
at least one of said input ports includes a first processing means for processing external input signals and for causing the transfer of the thus processed input signal to said control circuit via said internal output port, and
said common control circuit includes a second processing means for processing signals received from said at least one input port via said internal output port and for causing the transfer of the thus processed signal on at least one of the external output multiplex links.

21. A switching network according to claim 20, wherein said common control circuit includes a first memory circuit coupled to said second processing means for storing information relating to said downstream communication path segments, and said second processing means uses said information to select a downstream communication path segment to be connected to the upstream communication path segment on which the processed input signal was received.

22. A switching network according to claim 21, wherein said information includes traffic loan parameters for each output multiplex link of the switching element.

23. A switching network according to claim 21, wherein said second processing means stores relationship data identifying upstream and downstream communication path segments to be connected, in a second memory circuit coupled to said input ports by said second interconnection means, whereby said relationship data is available to the first processing means during subsequent processing of signals.

24. A switching network according to claim 19, wherein each of said input ports has a data output and an address output respectively coupled to an individual data input and a common address input of said first interconnection means, respectively, said common address input enabling said first interconnection means to select any of said output ports for connection to the respective data input.

25. A switching network according to claim 24, wherein said at least one input port includes a buffer circuit to store an input signal received on a respective upstream communication path segment, and an interface circuit to store an input signal received from said control circuit, and said first processing means derives from each of said input signals a respective output signal which is applied to said address output.

* * * * *